US008129010B2

(12) United States Patent
Kobayashi et al.

(10) Patent No.: US 8,129,010 B2
(45) Date of Patent: Mar. 6, 2012

(54) ADHESIVE SHEET

(75) Inventors: Kenji Kobayashi, Tokyo (JP); Shuji Morikawa, Tokyo (JP); Satoru Kobata, Tokyo (JP)

(73) Assignee: Lintec Corporation, Tokyo (JP)

( * ) Notice: Subject to any disclaimer, the term of this patent is extended or adjusted under 35 U.S.C. 154(b) by 743 days.

(21) Appl. No.: 12/189,456

(22) Filed: Aug. 11, 2008

(65) Prior Publication Data

US 2009/0053446 A1 Feb. 26, 2009

(30) Foreign Application Priority Data

Aug. 24, 2007 (JP) ................................. 2007-218818

(51) Int. Cl.

| | |
|---|---|
| ***B32B 9/00*** | (2006.01) |
| ***B32B 33/00*** | (2006.01) |
| ***B42D 15/00*** | (2006.01) |
| ***B65D 65/28*** | (2006.01) |

(52) U.S. Cl. ..................... 428/40.1; 428/42.2; 428/42.3; 428/43; 283/72; 283/98; 283/99; 283/100; 283/101; 283/105

(58) Field of Classification Search ................. 428/40.1, 428/41.7, 42.1, 42.2, 42.3, 43; 283/72, 98, 283/99, 100, 101, 105
See application file for complete search history.

(56) References Cited

U.S. PATENT DOCUMENTS

| | | | | |
|---|---|---|---|---|
| 3,974,311 | A * | 8/1976 | Cherrin | 428/43 |
| 4,110,502 | A * | 8/1978 | Baer | 428/42.1 |
| 5,071,167 | A * | 12/1991 | O'Brien | 283/79 |
| 5,340,158 | A * | 8/1994 | Bartl | 283/81 |
| 6,589,623 | B2 * | 7/2003 | Roth | 428/40.1 |
| 6,656,554 | B1 * | 12/2003 | Spina | 428/40.1 |
| 2009/0053450 | A1 | 2/2009 | Kobayashi et al. | |

FOREIGN PATENT DOCUMENTS

| | | | |
|---|---|---|---|
| JP | 05-080701 | A | 4/1993 |
| JP | 11-338354 | A | 12/1999 |
| JP | 2006-267337 | A | 10/2006 |
| WO | 2006/100961 | A1 | 9/2006 |

* cited by examiner

*Primary Examiner* — Patricia Nordmeyer
(74) *Attorney, Agent, or Firm* — Westerman, Hattori, Daniels & Adrian, LLP

(57) ABSTRACT

An adhesive sheet applicable to a delivery slip and the like includes a first sheet having a first sheet base of which both surfaces are formed as printable surfaces; and a second sheet having a second sheet base of which one surface is formed as a printable surface, while the other surface is sequentially laminated with a pseudo-adhesive layer, and an adhesive layer, and the adhesive layer is formed as a printable surface of mirror letters. In the first sheet, a predetermined area of the printable surface is laminated with a release agent layer, and the release agent layer is overlapped with the adhesive layer so as to be opposing thereto. And then, by sticking the adhesive layer of the second sheet exposed outside the exterior edge of the first sheet to the adherend, the first sheet can be held with print letters concealed.

6 Claims, 5 Drawing Sheets

ADHESIVE SHEET

BACKGROUND OF THE INVENTION

1. Field of the Invention

The present invention relates to an adhesive sheet, and more particularly to an adhesive sheet capable of sticking to an adherend with confidential information concealed, and also capable of printing a lot of information by allowing multifaceted printing.

2. Description of the Related Art

Recently, with the universal spread of Internet shopping, TV shopping, and the like, mail-order sales have become popular in addition to traditional over-the-counter sales, and a distribution system by delivery companies to deliver products to consumers on behalf of sellers has been increasingly common. Consequently, leaks of information about the products such as the product name and price may be caused through the delivery slips. These information identify the products bought by the consumers, therefore such information are confidential information greatly concerning privacy of the consumers. Also from the perspective of discouraging theft during the course of distribution, they should be confidential information because the product value can be figured out from the product price.

A label stack which can be used as a delivery slip is disclosed in the patent document 1. The label stack includes a label and a sheet for the label, and is arranged that the sheet for the label is sandwiched between the label and the adherend by sticking the adhesive layer of the label which is outside of the exterior edge of the sheet for the label to the adherend in a state that these respective adhesive layers of the label and the sheet for the label are stuck to each other. Therefore, contents printed on the sheet for the label are concealed, and thus the sheet for the label can be used as a printable surface for the confidential information.

Patent Document 1: Japanese Patent Application Laid-Open No. 2006-267337

SUMMARY OF THE INVENTION

However, the label stack disclosed in the patent document 1 has a disadvantage that there is a limit in increasing print information due to the arrangement in which only one surface of the sheet for the label, that is, only the non-adhesive layer side, is printed.

Also, it might be hard to let users know that the sheet for the label printed with the confidential information exists between the label and the adherend. For example, when it is used as a delivery slip for a product via home-delivery, there is room for some improvement about a possibility that the recipient would throw it away without taking out the sheet for the label.

The present invention has been made in view of the above disadvantages, and its object is to provide an adhesive sheet capable of printing a lot of information by increasing printable surfaces without enlarging the plane area, and suitable for the recipients to comprehend handling of the delivery slip easily when the present invention is applied to the delivery slip and the like.

In order to achieve the above object, the present invention adopts such an arrangement that an adhesive sheet includes: a first sheet having a first sheet base of which both surfaces are formed as printable surfaces; and a second sheet having a second sheet base of which one surface is formed as a printable surface with a size enlarged out of the exterior edge of the first sheet, while, the other surface is laminated with a pseudo-adhesive layer and an adhesive layer; wherein at least one surface of the first sheet is printed in advance; and a predetermined area of the printed surface is laminated with a release agent layer; and then, when the release agent layer is overlapped with the adhesive layer so as to be opposing thereto to stick to an adherend by the adhesive layer of the second sheet which is exposed outside the first sheet; the first sheet is held between the second sheet and the adherend.

And in the present invention, such an arrangement may be adopted that the first sheet has perforated-lines along the exterior edge of the release agent layer, and a portion of the first sheet is provided detachably from the second sheet along the perforated-lines.

Also, the pseudo-adhesive layer or the adhesive layer of the second sheet may be formed as a printable surface of mirror letters.

Further, such an arrangement is adopted that the pseudo-adhesive layer and the adhesive layer have translucency, and the mirror letters are visibly provided when the second sheet base is peeled off at the interface of the pseudo-adhesive layer.

Furthermore, it is desirable to provide concealing treatment on a predetermined area including an area around the mirror letters on the adhesive layer.

Still further, such an arrangement may be desirably adopted that the adhesive sheet further includes a stripping-off means of the second sheet.

Paper and resin film can be used for the first and the second sheet bases in the present invention. And, the pseudo-adhesive layer may be arranged in a layered structure with a first pseudo-adhesive layer and a second pseudo-adhesive layer, and they are provided detachably at their interface. As for the first and the second pseudo-adhesive layers, polyethylene resin, polystyrene resin, acrylic resin, natural rubber-base resin, vinyl chloride-vinyl acetate copolymer, ethylene-vinyl acetate copolymer, UV-curable varnish, polyethylene terephthalate resin, and the like may be exemplified, and they may be optionally combined to form the pseudo-adhesive layer.

Also, in the present invention, "print letters" is used as a concept including characters, symbols, graphics, or their optional combinations.

According to the present invention, both surfaces of the first sheet base are formed as printable surfaces, and at least one surface is printed with print letters in advance and a predetermined area of the printable surface is provided with a release agent layer, and then, by overlapping the release agent layer therewith so as to be opposing to the adhesive layer side of the second sheet, and by peeling off or detaching the first sheet from the second sheet, the printed contents become visible. Therefore, information volume can be increased as compared to a conventional type in which only one surface is formed as the printable surface, even if the recording medium has the same plane area.

Further, in the arrangement that the first sheet is provided with perforated-lines so as to be detachable from the second sheet, the first sheet can be undetachably held by securely sticking portions located outside of the perforated-lines of the first sheet to the second sheet, while, an portion located inside of the perforated-lines can be detached from the second sheet as a necessary portion to file it.

Furthermore, because the second sheet base is arranged to be sequentially laminated with the pseudo-adhesive layer and the adhesive layer in which the pseudo-adhesive layer or the adhesive layer is printed with mirror letters, the mirror letters become visible when peeling off the second sheet base at the interface of the pseudo-adhesive layer, therefore also from this point of view, it is capable of printing a lot of information. Especially, the pseudo-adhesive layer and the adhesive layer are made up of materials having translucency and the mirror letters are formed to be visible, therefore an indication which draws attention of recipients to existence of the first sheet can be included, thus such a disadvantage as throwing it away without noticing the existence of the first sheet may be avoidable.

Still further, concealing treatment is provided on a predetermined area including an area around the mirror letters on the adhesive layer, thereby preventing from becoming illegible by overlap of the mirror letters and the print letters on the first sheet base.

Yet still further, by the arrangement of providing the stripping-off means of the second sheet, a stripping-off process after sticking the adhesive sheet to the adherend can be performed easily.

DETAILED DESCRIPTION OF THE PREFERRED EMBODIMENT

Hereinafter, an embodiment of the present invention will be described with reference to the accompanying drawings.

Figure 1:
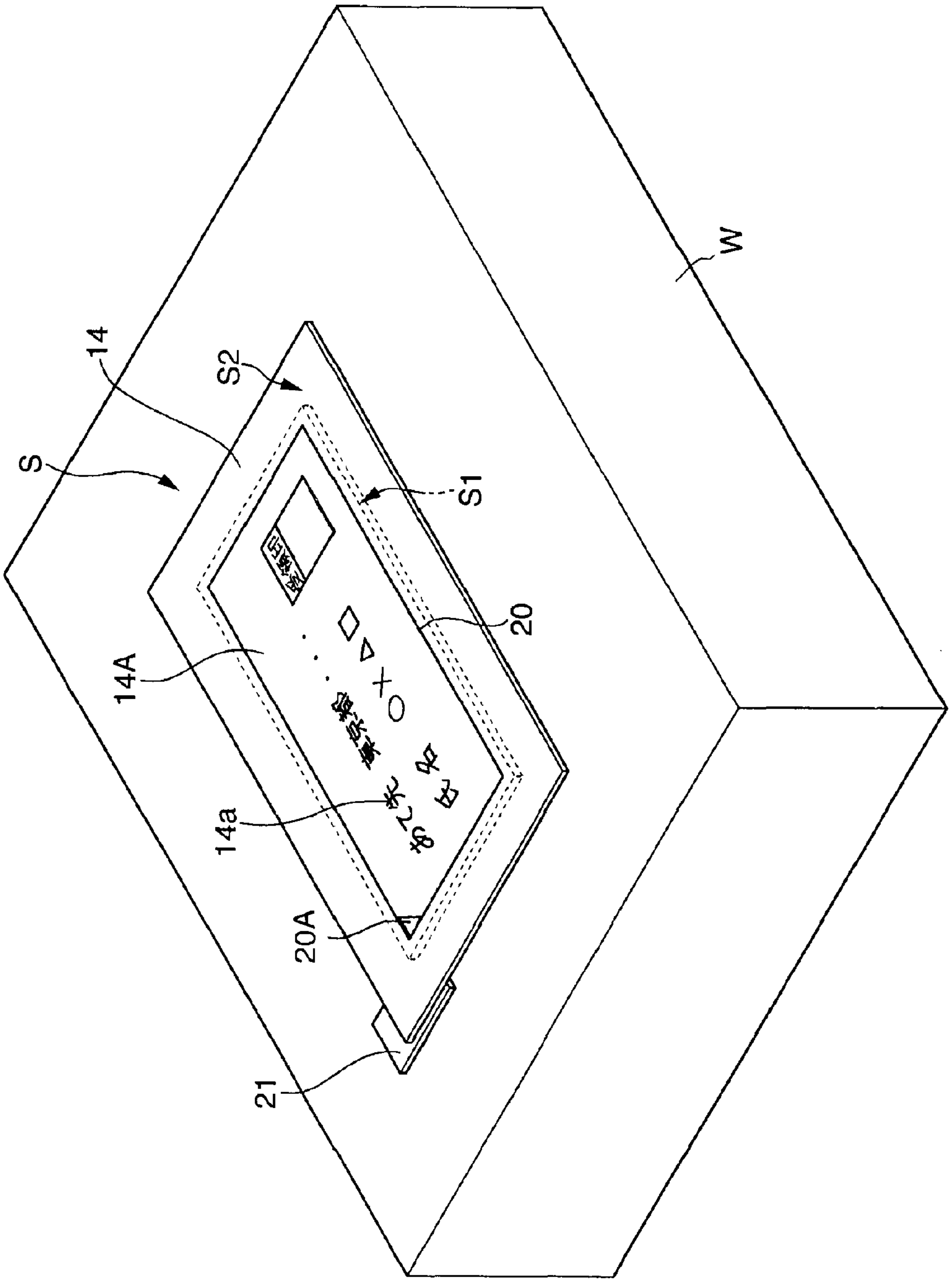
FIG. 1 is a perspective view schematically showing an embodiment of a delivery slip to which an adhesive sheet according to the present invention is applied.
Figure 2:
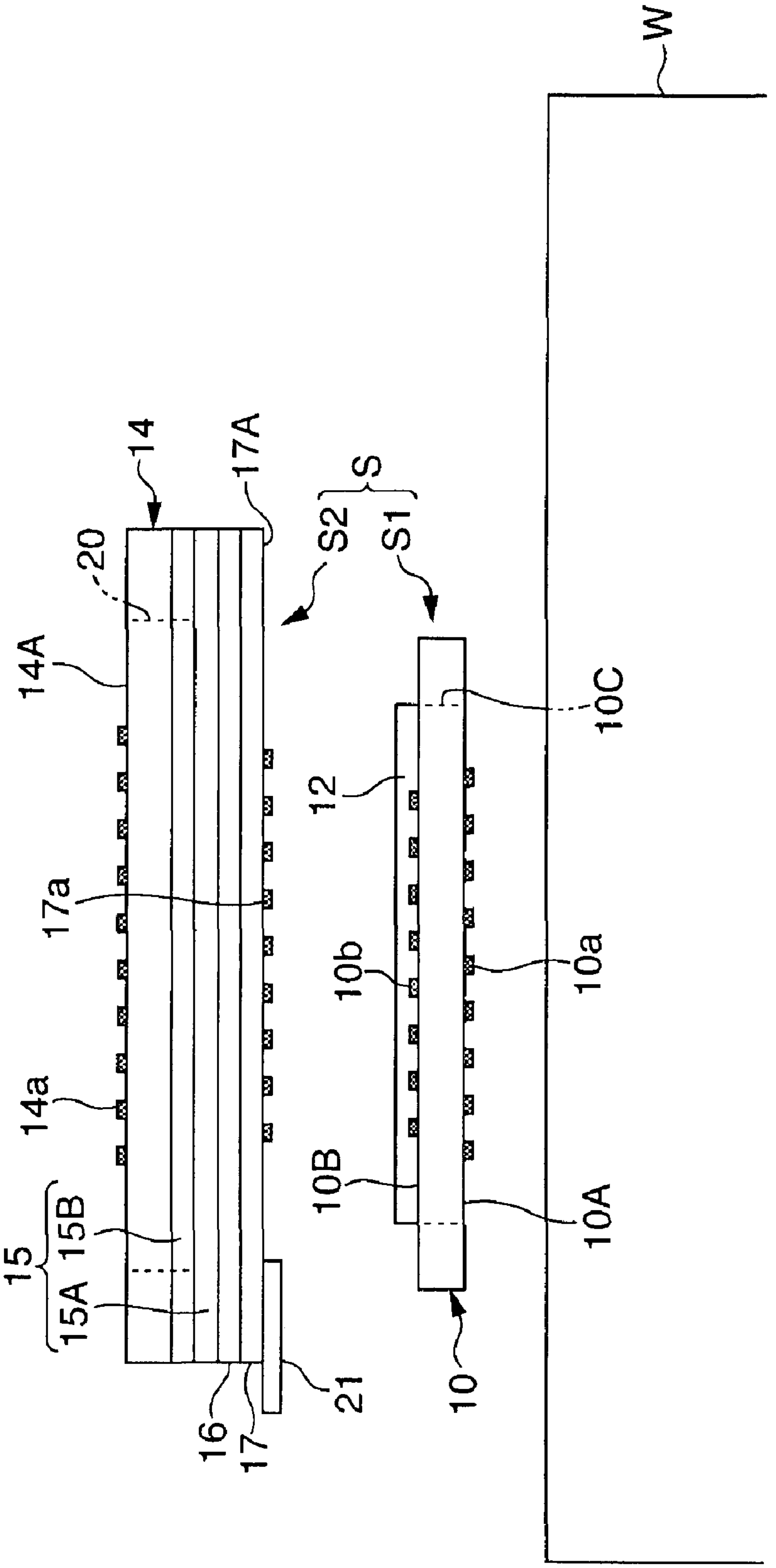
FIG. 2 is an exploded side view showing a layered structure of the adhesive sheet.

FIG. 1 shows a schematic perspective view of an embodiment of a delivery slip of a product via home-delivery and the like to which an adhesive sheet S according to the present invention is applied, and FIG. 2 shows an exploded side view thereof. In these drawings, an adhesive sheet S is stuck to an adherend W to be a package of a product via home-delivery and the like. The adhesive sheet S includes, as shown in FIG. 2, a first sheet S1 and a second sheet S2.

The first sheet S1 includes a first sheet base 10 of which both surfaces are formed as printable surfaces 10A and 10B to be printed with print letters 10*a* and 10*b*, and a release agent layer 12 which is provided on the printable surface 10B, being laminated on a predetermined area of the printable surface 10B. In the embodiment, the first sheet base 10 is made up of paper, and is formed in a substantially square outline in planar shape. And, the release agent layer 12 is provided on the portion other than the areas along both right and left edges of the first sheet base 10 in FIG. 2. The release agent layer 12 is made up of a material having translucency, for example, silicone resin and the like, and is to be provided after printing of the print letters 10*b*. Therefore, in the embodiment, the printable surface 10B is, not particularly limited but, indicated with a formulaic description such as an explanation about “cooling-off”. In this regard, as for the first sheet base 10, perforated-lines 10C are formed in the positions along both right and left edges of the release agent layer 12 in FIG. 2, and the upper surfaces of the outer areas of the perforated-lines 10C stick to the second sheet S2 to be held by the second sheet S2, while the portion between the perforated-lines 10C, that is, the area where the print letters 10*a* and 10*b* are provided can be cut away (refer to FIG. 4).

The second sheet S2 is provided in a layered structure having a second sheet base 14, and one surface of the second sheet base 14 (upper surface in FIG. 2) is formed as a printable surface 14A, while, the other surface is sequentially laminated with a pseudo-adhesive layer 15, a glassine paper 16, and an adhesive layer 17. In the embodiment, the second sheet S2 has a size enlarged out of the exterior edge of the first sheet S1, that is, a shape with a larger plane area than that of the first sheet S1. Also, a surface of the adhesive layer 17 (lower surface in FIG. 2) is formed as a printable surface 17A, and the printable surface 17A is to be printed with mirror letters 17*a*. Therefore, the pseudo-adhesive layer 15, the glassine paper 16 and the adhesive layer 17 are formed to have translucency. Here, the pseudo-adhesive layer 15 includes a first pseudo-adhesive layer 15A made up of polystyrene, and a second pseudo-adhesive layer 15B made up of low-density polyethylene, to be detachable at their interface. In this regard, the adhesive layer 17 is provided with a concealing treatment (not shown) on a predetermined area including an area around the mirror letters 17*a* by full-surface printing, dot-pattern printing or the like. The concealing treatment can be performed by background printing on the area other than the mirror letters 17*a* area when printing the mirror letters 17*a*. This allows the letters to prevent from becoming illegible by overlapping the mirror letters 17*a* and the print letters 10*b* on the first sheet base 10 when peeling off the second sheet base 14 between the layers of the pseudo-adhesive layer 15 in a state that the adhesive sheet S is attached to the adherend W.

In the second sheet S2, a perforated-line or a cutting-line 20 is formed in the second sheet base 14 and the second pseudo-adhesive layer 15B along the substantially square shaped track in plane view, and the print letters 14*a* including “address”, “name”, “receipt stamp” and the like can be printed on the surface of the second sheet base 14 within the area surrounded by the cutting-line 20. In addition, a punch-out portion 20A is formed in one corner of the cutting-line 20 that makes easier to peel off the second sheet base 14 portion, that is, the inner area of the cutting-line 20, by picking the punch-out portion 20A with a fingertip. Further, a piece-like tab 21 as a stripping-off means which is stuck to the adhesive layer 17 being sticking out is provided on the second sheet S2.

Next, usage of the adhesive sheet S in accordance with the embodiment will be described.

To begin with, as for the first sheet S1, the release agent layer 12 is laminated on the printable surface 10B in a state that the print letters 10*b* as the aforementioned formulaic description are printed thereon in advance. The first sheet S1 is to be loaded on a printer to print confidential information, that is, print letters 10*a* such as the product name and price, and a column for the receipt and the like.

On the other hand, as for the second sheet S2, destination, address and the like of the recipient, and also a column for the receipt stamp and the like are printed on the second sheet base 14. In addition, the mirror letters 17*a* are printed on the printable surface 17A of the adhesive layer 17.

Next, overlap both sheets S1 and S2 together so that the release agent layer 12 of the first sheet S1 is opposing to the adhesive layer 17 of the second sheet S2, and stick the right and left upper surfaces of the first sheet base 10 in FIG. 2, those are outside of the release agent layer 12, to the adhesive layer 17 to obtain an integrated adhesive sheet S. The adhesive sheet S is maintained in a state that the adhesive layer 17 is exposed outside the exterior edge of the first sheet S1.

Then, attach the adhesive layer 17 area exposed outside the exterior edge of the first sheet S1 to the adherend W, whereby the first sheet S1 is sandwiched and held between the second sheet S2 and the adherend W. Thus, the confidential information print letters 10*a* printed on the printable surface 10A of the first sheet base 10 are to be concealed.

Figure 3:
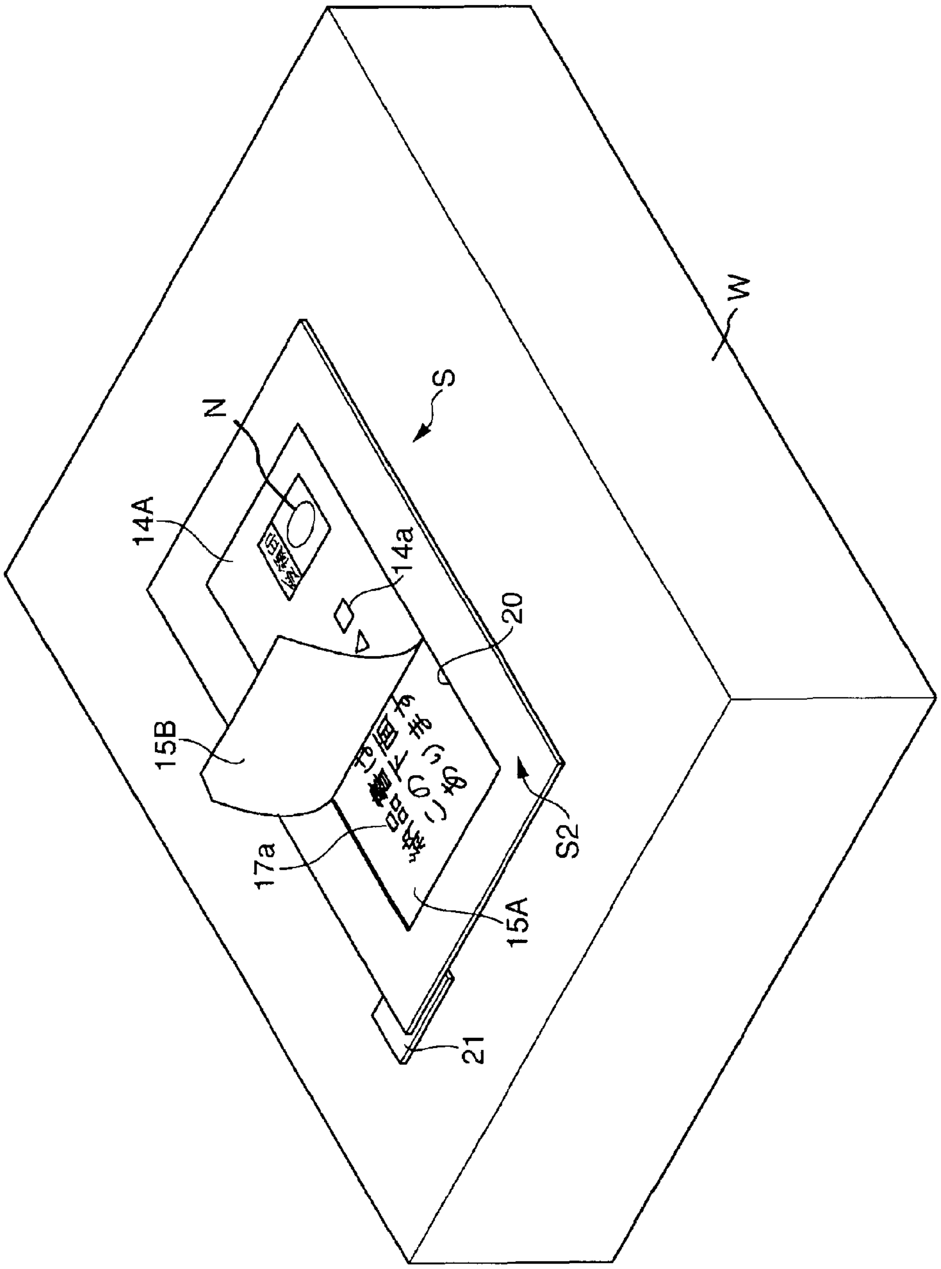
FIG. 3 is a perspective view schematically showing a peeling state of the second sheet base portion.

When a product via home-delivery as an adherend W stuck with the adhesive sheet S is delivered to a recipient, the delivery person asks the recipient to stamp the stamp N of the recipient on the column for the receipt stamp in the second sheet base 14, and peels off the inner area surrounded by the cutting-line 20 (refer to FIG. 3). The peeling-off is performed at the interface between the first pseudo-adhesive layer 15A and the second pseudo-adhesive layer 15B, whereby the mirror letters 17*a* printed on the adhesive layer 17 is exposed through the first pseudo-adhesive layer 15A, the glassine paper 16, and the adhesive layer 17, that enables to let the recipient know the indication, for example, "Invoice is on the lower surface of this sheet".

Figure 4:
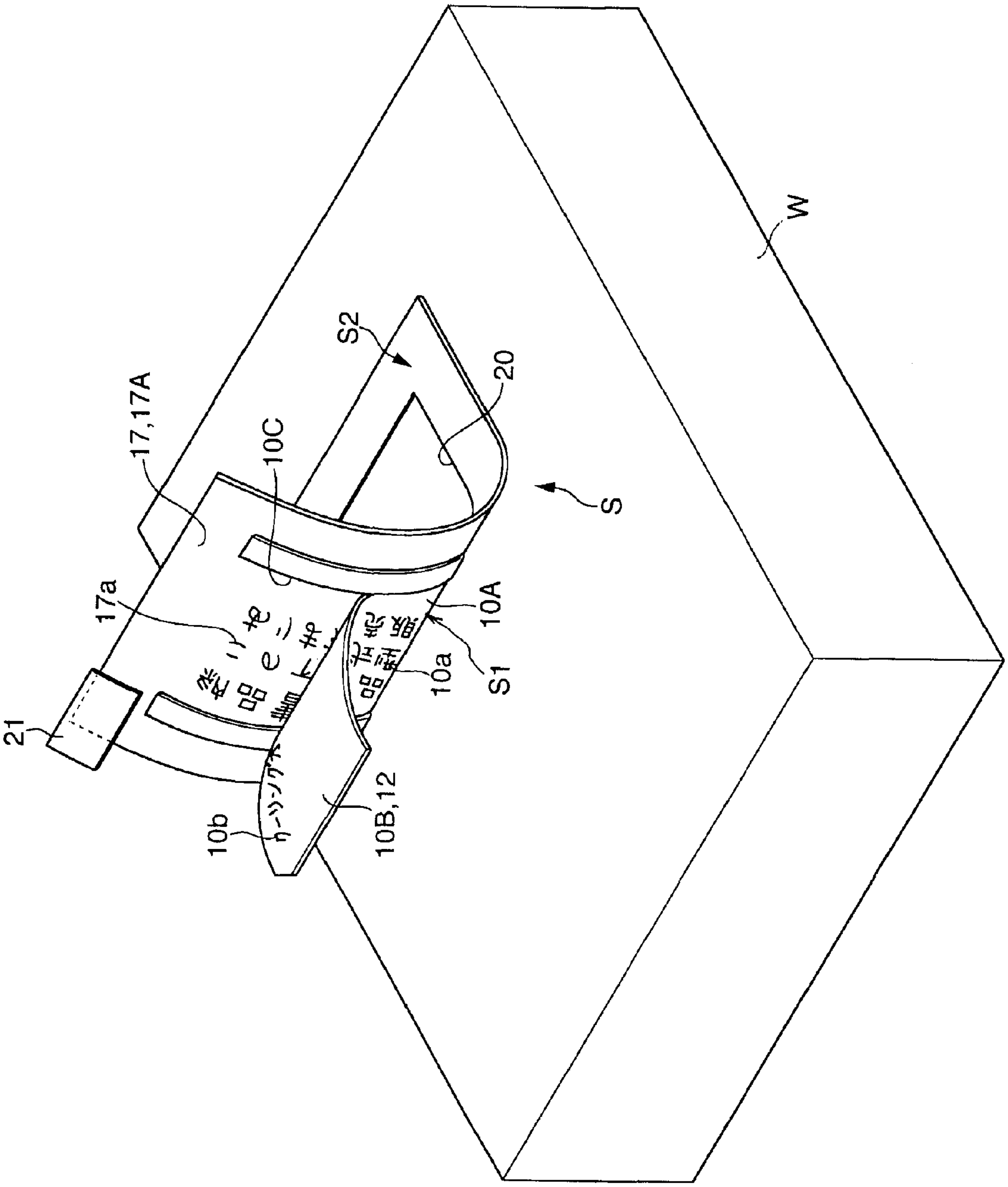
FIG. 4 is a perspective view schematically showing a manner of detaching the first sheet portion from the second sheet through peeling off the adhesive sheet.

Accordingly, as shown in FIG. 4, the recipient picks the aforementioned tab 21 and peels off the adhesive sheet S from the adherend W. By the peeling-off, the second sheet S2 can be detached being accompanied with the first sheet S1, and then, by cutting off the portion corresponding to the aforementioned invoice between the perforated-lines 10C, that is, the first sheet S1 portion, the portion can be detached from the second sheet S2. Here, because the corresponding portion to the invoice between the perforated-lines 10C is laminated with the release agent layer 12, and other areas are attached firmly to the adhesive layer 17, the corresponding portion to the invoice can be easily detached along the perforated-lines 10C.

On the printable surface 10B of the first sheet S1 portion detached in this way, a description, for example, an explanation about "cooling-off" and the like can be seen.

Therefore, according to the embodiment as described above, even the delivery person cannot see the contents printed on the first sheet S1. Thus, an adhesive sheet which can securely protect personal privacy can be provided by using it as a delivery slip for mail-order sales and the like. Further, since multifaceted printing is enabled, information volume can be increased even if the recording medium has the same plane area. Furthermore, by printing including a product guarantee card and the like, an easy-to-use adhesive sheet even with no necessity of the process to put the separate guarantee card into the adherend W can be provided.

The best arrangement, method and the like for carrying out the present invention have been disclosed so far. However, the present invention is not limited to the above.

That is, the present invention has been illustrated and described mainly about a specific embodiment. However, it is possible for those skilled in the art to add various modifications, if necessary, to the above-described embodiment with respect to the shape, position and/or disposition without departing from the technical spirit and the range of the object of the present invention.

Figure 5:
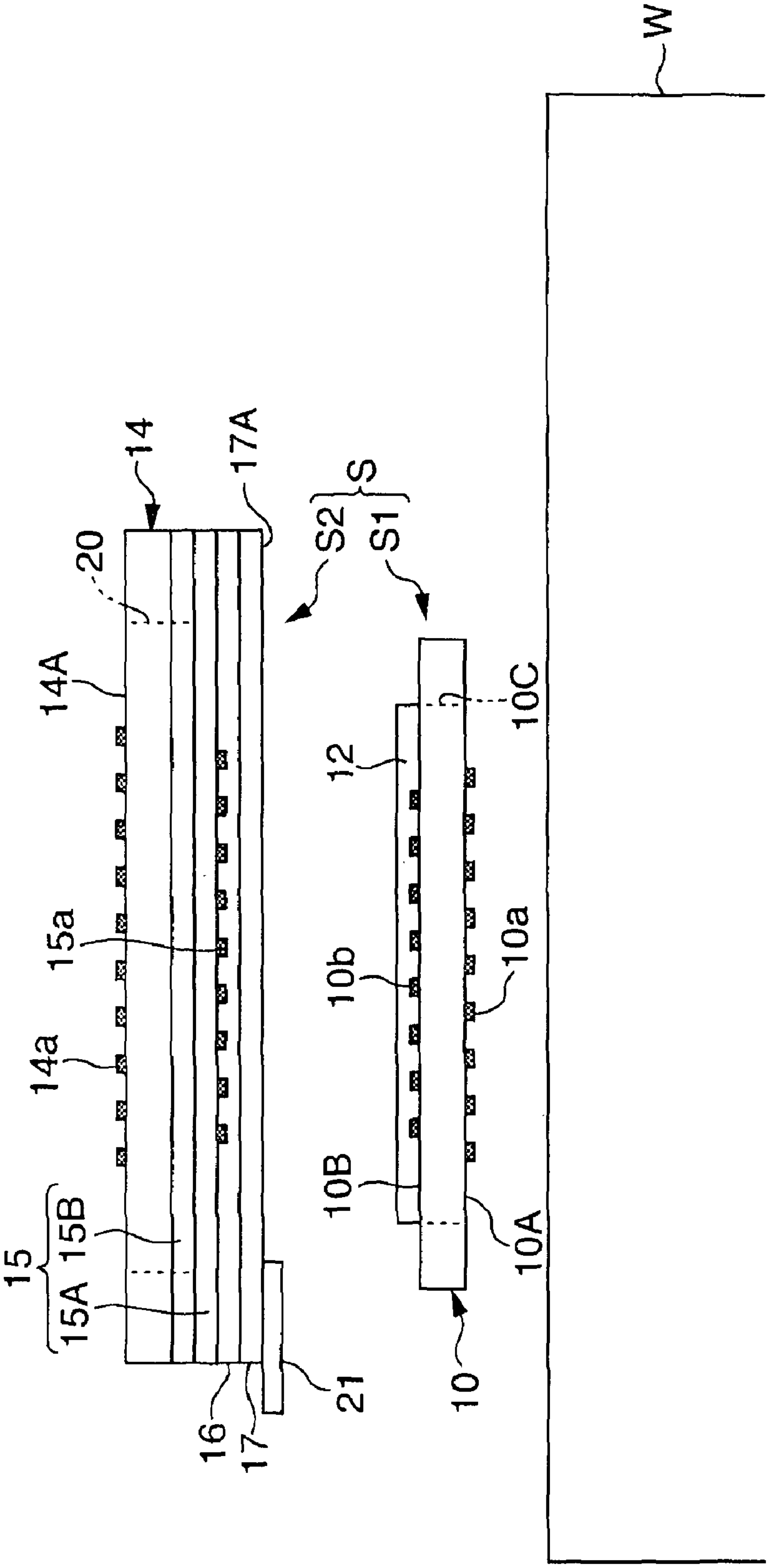
FIG. 5 is an exploded side view showing an alternative example of the embodiment similar to FIG. 2.

For example, in the above embodiment, an arrangement in which the mirror letters 17*a* are printed on the adhesive layer 17 has been illustrated and described. However, the present invention is not limited to the above. As shown in FIG. 5, the mirror letters 15*a* may be printed on the lower surface of the first pseudo-adhesive layer 15A in the figure, and in this way too, the mirror letters 15*a* become visible when peeling off the second sheet base 14, similarly to the embodiment above.

And, number of layers in the adhesive sheet S according to the present invention is not limited to the illustrated arrangement example, and the layers may be increased and decreased as necessary.

Also, the glassine paper 16 shown in the embodiment above may be omitted, or may be arranged with a substitute such as paper and resin film having translucency, instead.

Further, the adhesive sheet S may be applied, not limited to the delivery slip of the product via home-delivery, but also to other labels and the like on which confidential information are required to be concealed without leaking out, and also, various changes such as the planar shape of the adhesive sheet S, and the relative plane area between the first and the second sheet S1 and S2, may be made as long as the confidential information can be concealed.

Furthermore, instead of providing the tab 21 as a stripping-off means, an appropriate cutout and the like may be formed on the outer circumference side of the second sheet base S2 so that peeling can be performed by picking the cutout and the like with a fingertip.

Still further, as for the first sheet base 10, the release agent layers may be provided on both surfaces thereof.

What is claimed is:

1. An adhesive sheet, comprising:

a first sheet having a first sheet base of which both surfaces are formed as printable surfaces; and a second sheet having a second sheet base of which one surface is formed as a printable surface and an opposite surface is laminated with a pseudo-adhesive layer on the opposite surface and an adhesive layer on the pseudo-adhesive layer;

wherein the second sheet is larger than the first sheet and is arranged such that an exterior edge of the second sheet extends outside of the exterior edge of the first sheet;

at least one surface of the first sheet is printed in advance; and a predetermined area of the printed surface is laminated with a release agent layer;

the release agent layer is overlapped by the adhesive layer of the second sheet so as to be opposing thereto to stick to an adherend by the exterior edge of the adhesive layer of the second sheet;

the first sheet is held between the second sheet and the adherend.

2. The adhesive sheet according to claim 1, wherein the first sheet has perforated-lines along the exterior edge of the release agent layer, and a portion of the first sheet is provided detachably from the second sheet along the perforated-lines.

3. The adhesive sheet according to claim 1, further comprising a stripping-off means of the second sheet.

4. The adhesive sheet according to claim 1 or 2, wherein the pseudo-adhesive layer or the adhesive layer of the second sheet is formed as a printable surface of mirror letters.

5. The adhesive sheet according to claim 4, wherein the pseudo-adhesive layer and the adhesive layer have translucency, and the mirror letters are visibly provided when the second sheet base is peeled off at the interface of the pseudo-adhesive layer.

6. The adhesive sheet according to claim 4, wherein concealing treatment is provided on a predetermined area including an area around the mirror letters on the adhesive layer.

* * * * *